US009176803B2

(12) United States Patent
Biberdorf et al.

(10) Patent No.: US 9,176,803 B2
(45) Date of Patent: Nov. 3, 2015

(54) COLLECTING DATA FROM A SYSTEM IN RESPONSE TO AN EVENT BASED ON AN IDENTIFICATION IN A FILE OF THE DATA TO COLLECT

(75) Inventors: Terry S. Biberdorf, Pine Island, MN (US); Meghna Paruthi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1516 days.

(21) Appl. No.: 11/464,219

(22) Filed: Aug. 14, 2006

(65) Prior Publication Data
US 2008/0058961 A1 Mar. 6, 2008

(51) Int. Cl.
*G06F 11/00* (2006.01)
*G06F 11/07* (2006.01)

(52) U.S. Cl.
CPC .......... *G06F 11/0778* (2013.01); *G06F 11/073* (2013.01); *G06F 11/0709* (2013.01); *G05B 2219/31166* (2013.01); *G05B 2219/34355* (2013.01)

(58) Field of Classification Search
USPC ........................................................ 709/224
See application file for complete search history.

(56) References Cited

U.S. PATENT DOCUMENTS

| | | | |
|---|---|---|---|
| 4,367,525 A * | 1/1983 | Brown et al. ................... 710/18 |
| 5,377,337 A | 12/1994 | Antognini et al. |
| 5,495,614 A | 2/1996 | Brent et al. |
| 5,671,441 A | 9/1997 | Glassen et al. |
| 5,696,701 A * | 12/1997 | Burgess et al. ................. 714/25 |
| 5,875,484 A | 2/1999 | Neuhard et al. |
| 5,884,019 A | 3/1999 | Inaho |
| 6,035,347 A | 3/2000 | Beardsley et al. |
| 6,075,941 A | 6/2000 | Itoh et al. |
| 6,141,777 A * | 10/2000 | Cutrell et al. ................ 714/47.3 |
| 6,223,228 B1 | 4/2001 | Ryan et al. |
| 6,347,374 B1 * | 2/2002 | Drake et al. ....................... 726/1 |
| 6,665,821 B1 | 12/2003 | Miyayama et al. |
| 6,711,642 B2 | 3/2004 | Huang |
| 6,839,869 B2 | 1/2005 | Doi et al. |
| 6,922,795 B2 | 7/2005 | Miyayama et al. |
| 6,965,889 B2 * | 11/2005 | Serrano-Morales et al. ... 706/47 |
| 6,973,517 B1 | 12/2005 | Golden et al. |
| 7,003,763 B2 | 2/2006 | Sudo et al. |

(Continued)

FOREIGN PATENT DOCUMENTS

JP 09099596 A 4/1997

OTHER PUBLICATIONS

Jaber, et al., "Built-In Self-Test Architecture," IBM Technical Disclosure Bulletin, May 1990, pp. 448-451.

*Primary Examiner* — Neveen Abel Jalil
*Assistant Examiner* — Karina Levitian
(74) *Attorney, Agent, or Firm* — Stephen J. Walder, Jr.; Parashos T. Kalaitzis

(57) ABSTRACT

Embodiments may comprise a data identifier to identify data to collect in response to an event and a data collector to collect the identified data. The data collector may comprise firmware, code in ROM, a state machine, and/or other logic, and the data identifier may also comprise firmware, code in ROM, a state machine, and/or other logic that may access information and/or code in a file or other data storage to identify the data to collect. The data storage may comprise information and/or code to identify the location of data to collect and, in some embodiments, the sequence with which to collect the data.

24 Claims, 5 Drawing Sheets

(56) References Cited

U.S. PATENT DOCUMENTS

| | | |
|---|---|---|
| 7,017,084 B2 | 3/2006 | Ng et al. |
| 7,203,630 B2 * | 4/2007 | Kolb et al. ............... 703/6 |
| 7,231,403 B1 * | 6/2007 | Howitt et al. ............... 1/1 |
| 7,404,075 B2 | 7/2008 | Alpers et al. |
| 7,483,810 B2 * | 1/2009 | Jackson et al. ............ 702/176 |
| 7,668,953 B1 * | 2/2010 | Sinclair et al. ............ 709/224 |
| 8,006,081 B2 | 8/2011 | Alpers et al. |
| 2002/0059419 A1 * | 5/2002 | Shinoda ............... 709/224 |
| 2005/0071514 A1 | 3/2005 | Anderson et al. |
| 2006/0031487 A1 * | 2/2006 | Noguchi et al. ............ 709/224 |
| 2006/0224873 A1 * | 10/2006 | McCormick et al. ........ 712/244 |
| 2006/0233310 A1 * | 10/2006 | Adams et al. ............... 379/2 |
| 2006/0259830 A1 | 11/2006 | Blevin et al. |
| 2007/0220518 A1 * | 9/2007 | Verbowski et al. .......... 718/102 |
| 2008/0021918 A1 * | 1/2008 | Rao ............... 707/102 |
| 2008/0234890 A1 * | 9/2008 | Okada et al. ............... 701/35 |

* cited by examiner

FIG 1B

BINARY FILE 134

| EVENT/CODE 160 | ECMD |
| --- | --- |
| INFORMATION ABOUT DATA TO COLLECT 170 | CAGE GROUP |
| | NODE GROUP |
| | PROCESSOR GROUP |
| | CORE GROUP |
| | RING/ARRAY GROUP |
| | STOP CLOCK DOMAIN DESCRIPTION |
| | SCOM ADDRESS |
| | CHAR ARRAY FOR EC ENTRIES |
| | NAME OF CHIP TYPE |
| | FLAG TO SIGNAL SAVE IN SEEPROM |
| | ERROR FLAG |

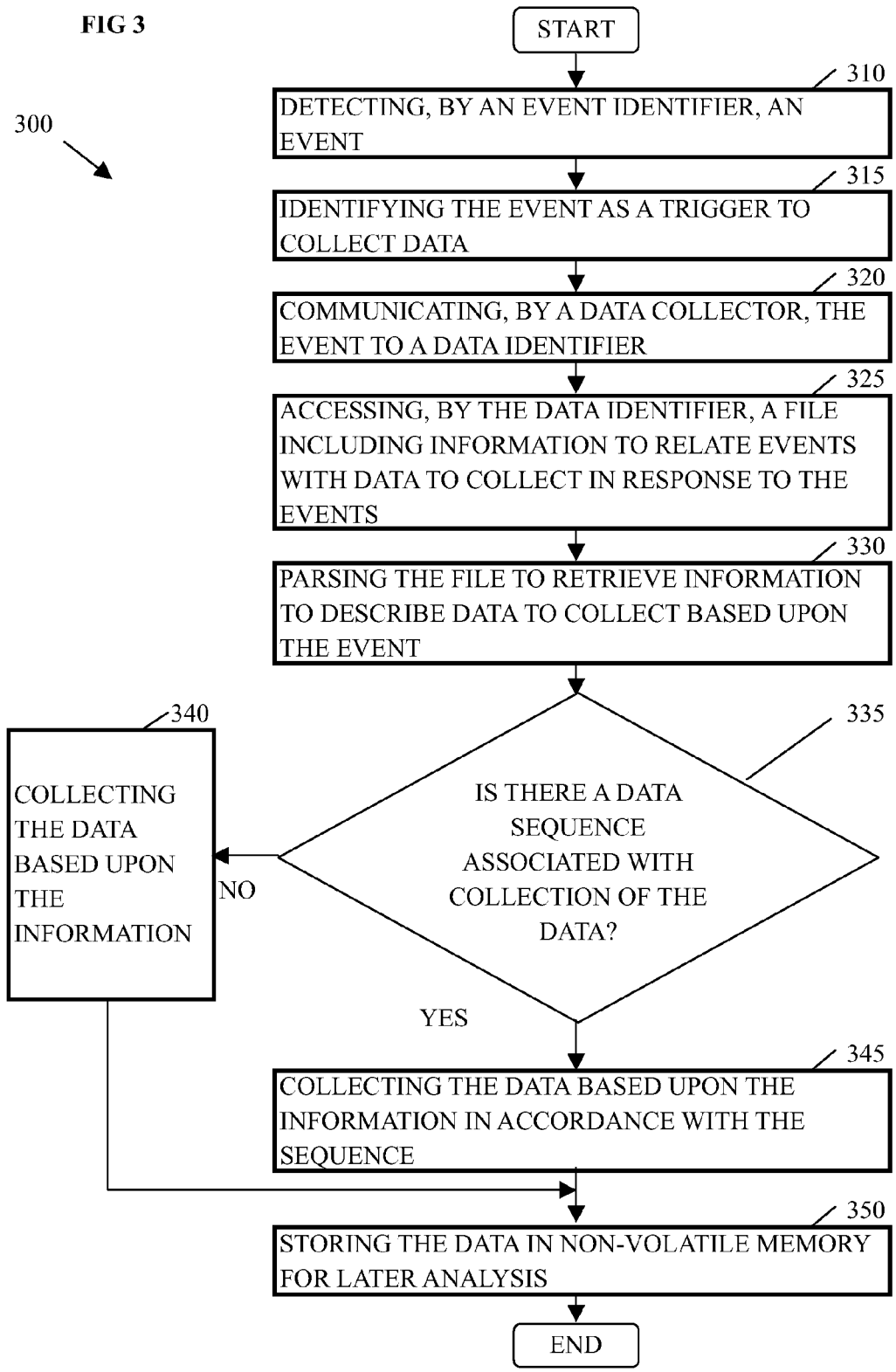

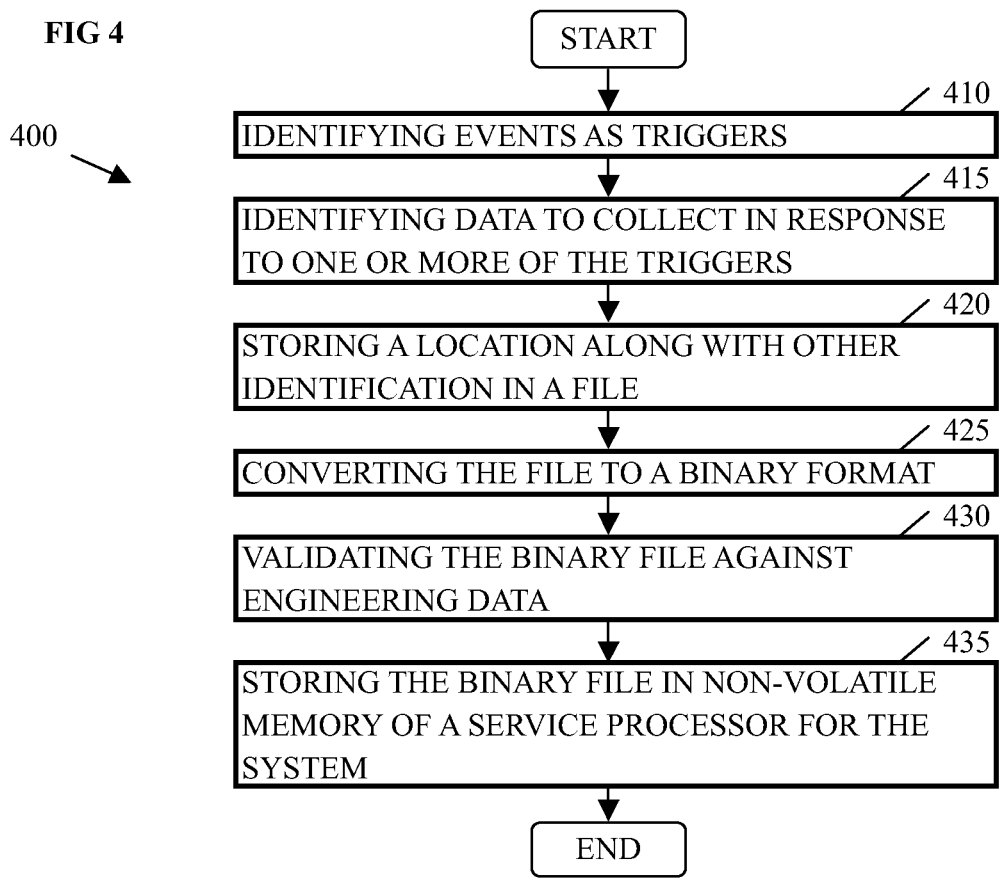

COLLECTING DATA FROM A SYSTEM IN RESPONSE TO AN EVENT BASED ON AN IDENTIFICATION IN A FILE OF THE DATA TO COLLECT

FIELD

The present disclosure relates generally to data collection. More particularly, the present disclosure relates to methods and arrangements to collect data from a system in response to an event such as an error, a failure, a log request, a periodic logging event, or the like.

BACKGROUND

Many aspects of life today depend upon the proper functioning of one or more computer systems. For instance, many tasks require the use of a personal computer, workstation, server, central electronics complex (CEC), or the like. One computer system routes emails, another routes phone calls, a further computer system executes software to draft documents, and still another controls the distribution of power to residences and workplaces. If any of such systems fails or otherwise becomes unavailable for a period of time, work may be delayed, communications disrupted, power disconnected, or the like. Thus, system designers engineer various ways of improving the reliability of computer systems.

The difficulty of identifying problems or areas for improvement related to reliability increases with the complexity of the computer system. For instance, laptops, in addition to the software running on them, are currently so complex that many errors related to the functioning of a laptop may not be evident even after intense investigation. Errors might be related to a conflict between lines of code, a failure of a board due to temperature variations or humidity, a failure of a hard drive, etc., and all these failures may produce very similar or the same results. The increased complexity of hardware and code executing on servers can make the task of identifying a problem infeasible when the only information available on the laptop is information that cannot be gathered until hours, days, or even weeks later.

To address the difficulty related to improving reliability of computer systems, such as locating areas for improvement or simply maintaining current backup of the system, designers have incorporated code to capture data related to the state or conditions of the system in response to selected events. For example, systems may include a periodic dump of data to non-volatile storage from, e.g., registers, buffers, or other memory within a computer system. Some of these systems even capture the state of processors so that downtime can be minimized or even eliminated in many situations via backup systems or redundant systems. To illustrate, some servers maintain running backups of software with data to facilitate transitions between a primary server and redundant server that are transparent or virtually transparent to users of the servers.

Ascertaining hardware and software conditions in response to events can prove tremendously useful, both in the design and engineering processes and during deployment. Current methods generally relegate the task of ascertaining system conditions to a firmware-based system dump process. Consequently, system dump instructions are typically hard-coded in non-volatile memory such as read-only memory (ROM) or flash memory, together with the firmware configuration and startup routines. Hard-coding instructions for collecting data increases the difficulty of updates or other modifications to the system dump instructions.

Furthermore, the hard-coded system dump instructions collect data from various memory locations in the system to capture an overall state of the system. The process typically requires 30 to 60 minutes for large systems and a significant but fixed amount of non-volatile data storage. Due to the large amounts of data available in today's systems, designers are forced to restrict the amount of data collected to balance the amount of data collected against the time it takes to collect the data and the amount of non-volatile data storage required to store the collected data. As a result, designers carefully select data to attempt to capture conditions related to a number of more common hardware and software events.

While the data collected may provide sufficient information to allow limited analysis of more common events, the collected data may provide insufficient data to analyze less common events or events related to system configuration changes implemented late in the design process or after deployment of the system. Furthermore, a significant amount of the data collected may not be useful at all in analyses of the events that trigger data collection because the hard-coded dump code collects data from the various memory locations without regard to the event that triggered the collection of data.

SUMMARY OF THE INVENTION

The problems identified above are in large part addressed by methods and arrangements provided herein to collect data from a system in response to an event. One embodiment comprises a method to gather data from a system in response to an event of the system. The method may involve accessing, by a data collector via a data identifier, a file to relate the event to data to collect in response to the event; receiving, by the data collector via the data identifier, an identification of the data to collect, wherein the identification associates the data with a memory location in the system; and accessing the memory location by the data collector to collect the data for storage.

Another embodiment comprises an apparatus to collect data from a system. The apparatus may comprise an event identifier to identify an event as a trigger to collect data, a data collector to collect data associated with the event, and a data identifier to access data storage to relate the event to one or more locations associated with the data and to communicate the one or more locations to the data collector.

Another embodiment includes a system to collect data in response to an event. The system may comprise a computer system comprising a data collector to collect data associated with the event; and a service processor to identify an event as a trigger to collect the data, to access data storage to relate the event to one or more locations associated with the data, and to communicate the one or more locations to the data collector.

Yet another embodiment includes a computer program product comprising a computer useable medium having a computer readable program. The computer readable program when executed on a computer causes the computer to receive an identification of the event at a data identifier; access, by the data identifier, a file to relate the event to data to collect in response to the event; and communicate, by the data identifier to a data collector, information about the data to collect to access the data and store the data in an output file.

BRIEF DESCRIPTION OF THE DRAWINGS

Aspects of the invention will become apparent upon reading the following detailed description and upon reference to the accompanying drawings in which like references may indicate similar elements:

FIG. 1B illustrates an embodiment of a binary file such as the binary file of FIG. 1A;

FIG. 3 illustrates a flow chart of an embodiment to collect data related and responsive to an event; and FIG. 4 illustrates a flow chart of an embodiment to generate and deploy a file such as the binary file illustrated in FIG. 1B.

DETAILED DESCRIPTION OF EMBODIMENTS

Figure 1A:
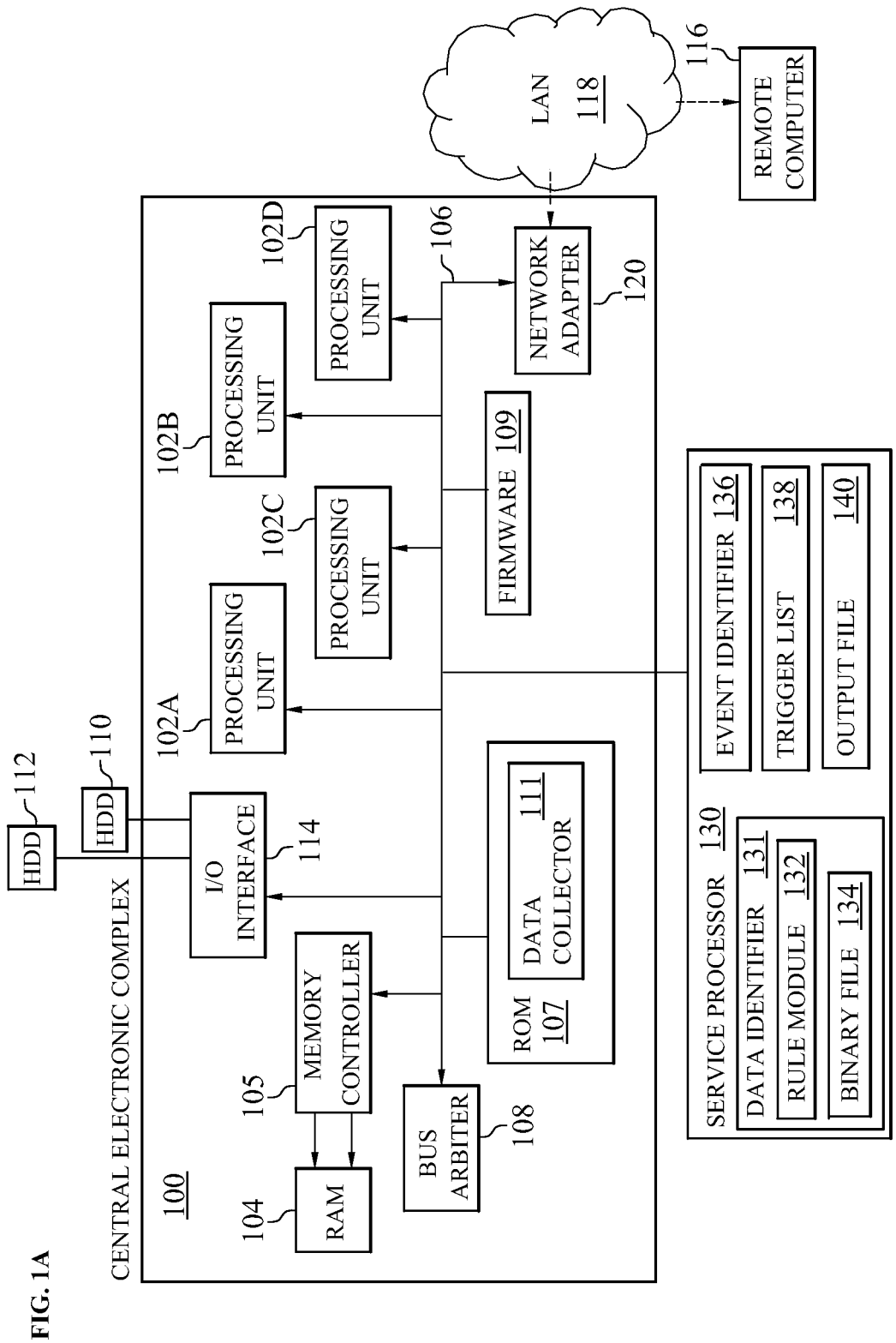
FIG. 1A depicts a system comprising a central electronic complex (CEC), a service processor and an remote computer communicatively coupled with the CEC via a local area network (LAN)

The following is a detailed description of novel embodiments depicted in the accompanying drawings. The embodiments are in such detail as to clearly communicate the subject matter. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Generally, methods and arrangements to collect data related to the state or conditions of a system are described herein. Embodiments may comprise a data identifier to identify data to collect in response to an event and a data collector to collect the identified data. The data collector may comprise firmware, code in ROM, a state machine, and/or other logic to collect the data for later analysis, and the data identifier may comprise firmware, code in ROM, a state machine, and/or other logic that may access an identification of the data to be collected in a file, or other data storage, by, e.g., location, content, and/or other characterizations of the data.

The identification in the file may comprise information and/or code designed in view of the system configuration to identify data that is likely to be useful in determining one or more conditions (or the state) of the system leading up to the event, of the event, and/or resulting from the event. In some embodiments, detailed data related to the conditions of the system can be stored in response to the event very quickly, e.g., within timeframes such as one minute. In further embodiments, detailed data related to conditions of the system can be stored in response to the event within timeframes that vary depending upon the particular event that triggered the collection of the data.

Many embodiments comprise arrangements to update the identification of the data in the file in response to a change in the system configuration. In some embodiments, the file may comprise the sequence with which to collect the data. For example, such a file may comprise an address or address range within memory of a specific component of the system, such as a memory controller, and relate the address range with events associated with that memory controller. The identification may also include a description or representation of the data to collect, and the data collector may utilize the description or representation to parse data within the address range of the memory controller to collect data in response to the triggering event, or trigger. Furthermore, collection of the data may corrupt the data so the identification may include a sequence inherently or explicitly with which to collect the data to avoid or attenuate corruption of the data.

In further embodiments, the data collector may comprise an event identifier to detect a system event that is a trigger to initiate data collection. For example, the data collector may detect an event, determine that the event is a trigger for data collection, and communicate the event to the data identifier. The data identifier may then identify data by, e.g., location, for collection and storage. The data collector may collect all the data at the location or parse through data at the location to select data for collection and storage.

In one embodiment, a data collector detects a trigger and communicates the trigger to a data identifier. The data identifier responds by accessing a binary file to collect information to describe data to collect, and returns the information. The data collector then collects the data based upon the information. The information may include, e.g., specific addresses from which to collect the data, general locations along with information to parse data at the general locations to find the data to collect, and possibly a data collection sequence to avoid corruption of the data at the general and/or specific addresses during collection. In further embodiments, a user interface may facilitate definition of data to collect prior to and/or during data collection.

While specific embodiments will be described below with reference to adapters, components, circuits, or logic configurations, those of skill in the art will realize that embodiments of the present disclosure may advantageously be implemented with other components and configurations.

Turning now to FIG. 1A, there is shown a system including a central electronic complex (CEC) 100 communicatively coupled with a remote computer 116 via a local area network 118 and communicatively coupled with a service processor 130. CEC 100 is a computer system that is adapted to collect data related to an event in response to the event. For example, if an error occurs in the execution of an operating system on CEC 100, service processor 130 may detect the error, determine that the error is related to software, or more particularly, the operating system, and instruct a data collector 111 of read only memory (ROM) 107 to collect data related to the software error.

Data collector 111 may receive instructions and/or information from service processor 130 regarding where and/or how to find the data to collect in response to the software error and to proceed to collect the data and store the data in an output file 140 of service processor 130. For instance, data collector 111 may receive instructions including an address or address range from which to collect data along with descriptors to characterize the data to collect and conditions precedent to collection of the data.

To illustrate, data collector 111 may receive instructions to collect data from registers that store data associated with the execution of the operating system as a well as memory locations that store code of the operating system that is being executed. In addition to the addresses, data collector 111 may receive instructions to collect the data having logical and/or physical addresses associated with code stored in one or more levels of cache for processing units 102A-D. Thus, an operating system technician may have extensive data to describe conditions of CEC 100 at the time of or immediately after the software failure.

CEC 100 may be a server such as an IBM eServer xSeries, iSeries, pSeries, i/pSeries, zSeries server, or the like. In other embodiments, CEC 100 may be a laptop, desktop, workstation, or the like, with built-in error detection for dumping data. In such embodiments, though, the facilities and functionality available from service processor 130, or a portion thereof, may be integrated into the CEC 100.

CEC 100 comprises one or more processing units 102A-102D, a system memory (RAM) 104 coupled to a memory controller 105, and a system interconnect fabric 106 that couples memory controller 105 to processing unit(s) 102 and other components of data processing system 100. Commands on system interconnect fabric 106 are communicated to various system components under the control of bus arbiter 108.

CEC 100 further includes non-volatile storage media, such as a first hard disk drive (HDD) 110 and a second HDD 112. First HDD 110 and second HDD 112 are communicatively coupled to system interconnect fabric 106 by an input-output (I/O) interface 114. Although hard disks are described above, it should be appreciated by those skilled in the art that other types of media which are readable by a computer, such as removable magnetic disks, CD-ROM disks, magnetic cassettes, flash memory cards, digital video disks, Bernoulli cartridges, and other later-developed hardware, may also be used to provide non-volatile data storage in the operating environment. Additional non-volatile storage is provided in ROM 107, which includes data collector 111, and firmware 109 for performing various system operations. In other embodiments, firmware 109 may comprise data collector 111, or part thereof, to facilitate future modifications to the code. In still further embodiments, data collector 111 may comprise a state machine or other logic.

CEC 100 may operate in a networked environment using logical connections to one or more remote computers, such as remote computer 116. Remote computer 116 may be a server, a router, a peer device, or other common network node, and typically includes many or all of the elements described relative to CEC 100. In a networked environment, program modules employed by CEC 100, or portions thereof, may be stored in a remote memory storage device, such as remote computer 116. The logical connections depicted in FIG. 1A include connections over LAN 118, but, in alternative embodiments, may include other networks types such as a wide area network (WAN), a wireless network, a fiber optic network, and the like.

In the present embodiment, data collector 111 may instruct collection of data on remote computer 116 in response to an event detected at CEC 100. For example, data collector 111 may receive an indication of an error in communications with remote computer 116 via network adapter 120. Data collector 111 may communicate the event to data identifier 131 and, in response, receive an instruction to collect data related to the operation of network adapter 120 and to instruct remote computer 116 to collect data related to communication with CEC 100. In other embodiments, remote computer 116 may comprise a similar data collector 111 that detects the event and collects data related to the event.

When used in a LAN networking environment, CEC 100 is connected to LAN 118 through an input/output interface, such as a network adapter 120. LAN 118 comprises communications media coupled with one or more communication devices to interconnect network adapter 120 of CEC 100 with remote computer 116. Communication devices may include servers, switches, routers, bridges, or any other device that can communicate via communication media. Communication media 140 may be implemented via wires, wireless transceivers, fiber optic filaments, and/or other communication media.

Service processor 130 may implement a booting sequence for CEC 100, run maintenance routines for CEC 100, and analyze errors or failures associated with CEC 100. In the present embodiment, service processor 130 comprises event identifier 136 to analyze errors and failures associated with hardware and software of CEC 100 to identify the source. Event identifier 136 may determine whether the source or the error is a trigger for collection data. In response to the trigger, service processor 130 may communicate with data collector 111 to initiate data collection in response to the event.

Service processor 130 comprises a data identifier 131 comprising a RULE module 132 and a binary file 134, event identifier 136, a trigger list 138, and an output file 140. Data identifier 131 may identify data to collect in response to an event. RULE module 132 may respond to the identification of a trigger event by accessing binary file 134. In some embodiments, service processor 111 instructs data collector 111 to collect data in response to the event and data collector 111 responds by communicating the event or an indication thereof to RULE module 132.

RULE module 132 may access binary file 134 to identify data to collect in response to the event. RULE module 132 may comprise code, a state machine, and/or other logic to execute on or in conjunction with a processor of service processor 130. In many embodiments, RULE module 132 may comprise one logic component of a module with a number of components.

Binary file 134 may be a file with identification such as instructions/code and/or information to describe data and, in some embodiments, a process for collecting data to data collector 111. In many embodiments, binary file 134 comprises a text file converted into a binary format to reduce the size of the file. In such embodiments, RULE module 132 may either access information directly from binary file 134 or decompress binary file 134, or portions thereof, to access the information. In further embodiments, binary file 134 may include instructions or code to store data collected in memory of corresponding hardware. For example, if the triggering event is a failure of memory controller 105, data collector 111 may receive instructions or information to collect data from registers associated with memory controller 105 and store the data in output file 140 as well as in a specified memory location of memory controller 105. In other embodiments, binary file 134 may be a text file that is not compressed into a binary format or may be compressed into another format.

Event identifier 136 detects events and compares the events against a trigger list 138 to determine whether the event should trigger the collection of data. In other embodiments, trigger list 138 may comprise part of binary file 134 and event identifier 136 may communicate the event to RULE module 132 in response to detection of the event. RULE module 132 may access binary file 134 to determine whether code or information in binary file 134 is associated with the event. If code or information is associated with the event, RULE module 132 may communicate the code or information to data collector 111 to instruct data collector 111 to collect the data.

Output file 140 may comprise a data structure to contain the data collected in response to the event to facilitate later analysis. In some embodiments, output file 140 may be transmitted to a third party for analysis via, e.g., LAN 118.

Referring to FIGS. 1A-B, an embodiment of binary file 134 of FIG. 1A is depicted. Binary file 134 has an identification in the form of a data structure comprising one or more portions. In the present embodiment, the data structure comprises a portion for an event/code 160 and a portion for information about data to collect 170. One or more records may be included in binary file 134 in this structure. The event/code 160 may comprise an indicator of an event and, in some embodiments, a command (ecmd). Event identifier 136 may access trigger list 138 in response to an event and communicate a corresponding event indicator to RULE module 132 to facilitate retrieval of related records in binary file 134. For example, the command may instruct data collector 111 to collect data from a memory location if the engineering changes (EC) level associated with the memory location is 10 or higher.

In some embodiments, the event/code 160 may include specific indicators of an event, more general indicators of an event, or both. For instance, the event code 160 may include an event indicator that describes either a software event or a hardware event. If no further event indicators are included in the record, content of the record may be communicated to data collector 111 in response to, e.g., any software event (if the indicator describes a software event).

The information about data to collect 170 may include a number of location indicators as well as other indicators. The information about data to collect 170 may include location indicators such as a cage group, a node group, a processor group, a core group, and a ring/array group. Each of these indicators may describe specifically where memory resides to facilitate collection of data from the memory. The information about data to collect 170 may further include: a stop clock domain indicator to indicate whether the stop clock should be executed, a software command address, a character array for engineering change (EC) entries to indicate values of EC entries, and a chip type to parse data for collection.

In the present embodiment, the information about data to collect 170 also includes a flag to signal whether to save the data in memory other than just output file 140 and an indicator of an error flag to set in case of a parsing error. Note that the present embodiment of binary file 134 provides one example of the file content but other file structures and contents are contemplated.

Figure 2:
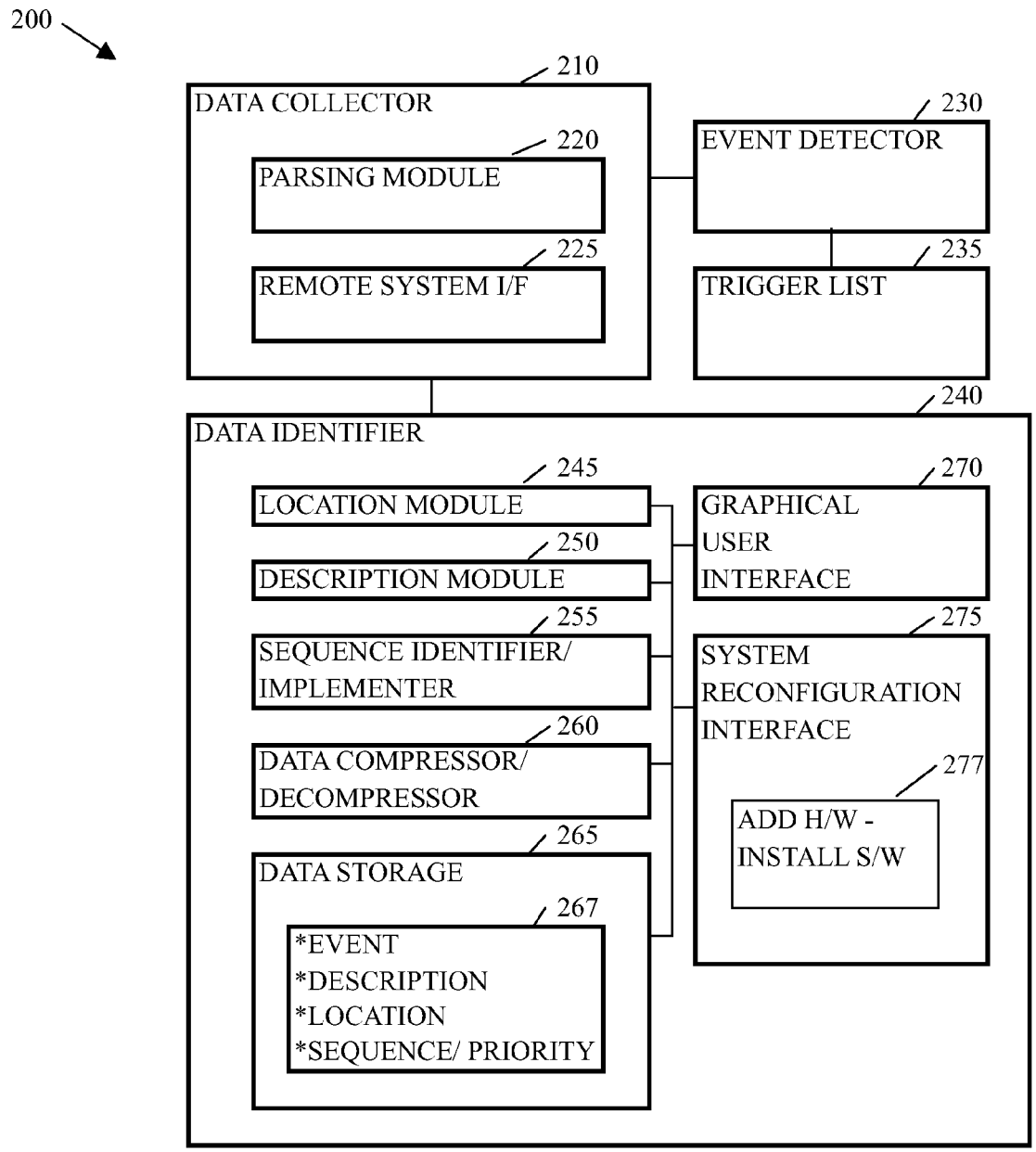
FIG. 2 depicts an apparatus comprising a data collector, a data identifier, and an event trigger to collect data related and responsive to an event.

Referring to FIG. 2, there is shown an embodiment of an apparatus 200 to collect data in response to an event on a system such as the system in FIG. 1A. Events on the system may include events such as an out of memory error during execution of a software application on the system or a failure of a card such as a network adapter within the system. Events that trigger data collection may be failures or errors, or may be periodic such as an alert to log the state of the system. For example, a data collection event may comprise an expiration of a timer or the occurrence of a date and time indicated in a scheduler utility. In such embodiments, instructions to collect data in response to the event may include instructions to collect data from a variety of sources to capture the state of the system.

On the other hand, when the event is related to a failure of a specific software application or hardware device, the event may trigger collection of data specifically selected based upon the configuration of the system to characterize conditions of the system that will facilitate analysis of the failure. In many embodiments, apparatus 200 may only collect data related to the event to minimize the amount of data collected and minimize downtime of the system.

Apparatus 200 may comprise code to execute on a processor or microcontroller, state machines, and/or other logic illustrated in FIG. 2 by a data collector 210, an event detector 230, a trigger list 235, and a data identifier 240. Data collector 210 may respond to an occurrence of an event that is a trigger to collect data by communicating with data identifier 240 to retrieve information to describe the data to collect such as the location(s) of the data and possibly indicators to parse data at the location(s) to selectively collect data from the location(s). In several embodiments, the data will be collected in a sequence indicated by data identifier 240. For example, event detector 230 may detect an event such as a memory access failure by a memory controller. Event detector 230 may respond by comparing the event to events in trigger list 235. If the content of trigger list 235 indicates that the failure is a trigger or that instructions related to the failure are included in data storage 265 of data identifier 240, event detector 230 may communicate the event to data collector 210.

Data collector 210 may indicate the event to data identifier 240. Data identifier 240 may respond with information and/or commands to indicate the data for data collector 210 to collect and, in some embodiments, conditions precedent to collection of the data. Data collector 210 may comprise a parsing module 220 and a remote system interface (I/F) 225. Parsing module 220 may parse data at locations indicated by data identifier 240 to locate and collect data in response to the event. For instance, parsing module 220 may parse locations for data identifiers, access flags or other status indicators, or the like, to determine whether data at a specified location or within a specified address range should be collected and stored in an output file.

Remote system I/F 225 may be an interface to facilitate coordination of data collection within one or more remote systems. For example, remote system I/F 225 may receive an event indicator from a remote system to initiate data collection based upon that event indicator. Such functionality may be useful for situations in which event detector 230 perceives the event differently than the remote system. In particular, the remote system may transmit an event indicator to remote system I/F 225 that is different from the event indicator produced by event detector 230. The additional event identifier from the remote system may trigger collection of data that may not otherwise be collected. Such functionality may also be useful for situations in which event detector 230 either does not recognize the event or the content of trigger list 235 does not identify the event as a trigger to collect data. In further embodiments, data collector 210 may receive instructions or information regarding data to collect from one or more remote systems via remote system I/F 225.

Data identifier 240 may be responsive to an event indication from data collector 210 to determine information about and/or code related to the collection of data in response to the event. Data identifier 240 may comprise a location module 245, a description module 250, a sequence identifier/implementer 255, a data compressor/decompressor 260, a data storage 265, a graphical user interface (GUI) 270, and a system reconfiguration interface 275. Location module 245 may associate one or more physical and/or logical memory addresses or address ranges with data to collect in response to an event based upon information collected from data storage 265. Description module 250 may associate one or more indicators with data at one or more of the locations to indicate data to collect in response to the event based upon information collected from data storage 265.

Sequence identifier/implementer 255 may identify a sequence for collecting data in response to the event and implement that data gathering sequence by, e.g., passing instructions to collect data from various locations in the sequence indicated or by communicating the sequence to data collector. For example, based upon a sequence indicated in data storage for collection of data in response to the event, sequence identifier/implementer 255 may transmit instructions to a queue of data collector 210 in the corresponding sequence.

In further embodiments, sequence identifier/implementer 255 may identify priorities associated with the collection of certain types of data or data at certain addresses. In response, sequence identifier/implementer 255 may include a priority indicator with information communicated to data collector 210 so that data collector 210 may collect the data in an order based upon the priorities associated with various locations. For example, certain data to be collected may become corrupted more quickly than other data to be collected depending upon the event. Thus, a higher priority may be placed on the data that will become corrupted. Alternatively, certain data may be more important to collect due to its value in analyzing the conditions of the system in relation to the event so that data to be collected may receive priorities for collection based upon the importance associated with the data.

Data compressor/decompressor 260 may be implemented in some embodiments to compress information or code to be stored in data storage 265 and decompress the information or code when accessing data storage 265. Other embodiments may comprise only decompression logic or no compression/decompression logic.

Data storage 265 may comprise a file 267 comprising an identification such as information and/or code to describe data to collect in response to one or more different events. The file 267 may relate event identifiers with information and/or code via a data structure and/or via content included within the file 267.

GUI 270 may comprise an interface for a user to access the file 265 and provide additional information or code to data identifier 240 before, during, and/or after data collection responsive to an event. For example, in addition to communicating information or code from data storage 265 to data collector 210 in response to an event, data identifier 240 may alert a user via GUI 270 and prompt the user for additional information and/or code to communicate to data collector 210. In some embodiments, data identifier 240 may prompt local users of the system and/or third party system technicians/administrators regarding the event so these users can dynamically adjust data to be collected. In further embodiments, users may initiate a logging event or log request via GUI 270.

System reconfiguration interface 275 may facilitate modification of the file 267 after deployment of the system. For example, if the system is a large server, adjustments to code or hardware late in the design process or during deployment may require updates to the file 267. Furthermore, additions of hardware and installation of software after deployment may require updates to the file 267. System reconfiguration interface 275 may comprise an add hardware-install software module 277 to automatically update the file 267 in response to new hardware or software being installed in the system. For instance, installation of new hardware will involve installation of a driver for the hardware so the driver may include information and/or code to describe data to collect in response to an error or failure related to the new hardware. The add hardware-install software module 277 may automatically incorporate the information and/or code into the file 267.

FIG. 3 illustrates a flow chart 300 of an embodiment to collect data in response to an event on a system such as the system illustrated in FIG. 1A. Flow chart 300 begins with identification of an event by an event identifier (element 310). The event identifier, for instance, may be part of monitoring logic of a service processor for the system. The event identifier may detect the event and identify the event as a trigger to collect data from the system (element 315). For example, the event identifier may be a system health monitor function executing on the service processor and the event identifier may detect an error flag set in response to an out of memory error.

Upon identifying the event as a trigger to collect data in the system, the event identifier may communicate the event to a data collector and the data collector may communicate the event to a data identifier to determine data to collect in response to the event (element 320). The data collector may comprise logic to perform the function of system dump code but the information or code that describes data to collect in response to the event may be in a file that is more readily modifiable than the data collector.

In response to receipt of the event indication from the data collector, the data identifier may comprise a RULE component to access a file including information to relate events to with data to collect in response to the events (element 325). The RULE component may comprise code, a state machine, or other logic to parse a file to retrieve information to describe data to collect based upon the event (element 330). For example, each record in the file may include an event identifier to generally or specifically identify events associated with the record.

On determination of the information or code associated with the event, decision element 335 determines whether a sequence is associated with the collection of data. In some embodiments, the data identifier may implement the determination. In other embodiments, the data collector implements the determination. If there is a sequence associated with the collection of data in response to the event because, e.g., data may be corrupted by the collection process, the data collector may collect the data in the indicated sequence (element 345) and the data may be stored in non-volatile memory for later analysis (element 350). Otherwise, the data may be collected in a sequence based upon other factors such as accessibility, availability of resources, priorities associated with the data, etc. (element 340), and the data may be stored in non-volatile memory for later analysis (element 350).

FIG. 4 illustrates a flow chart 400 of an embodiment to build a file such as the binary file 134 of FIG. 1B to collect data in response to an event on a system such as the system illustrated in FIG. 1A. The flow chart 400 begins with identifying potential events as triggers to collect data (element 410). The identification of potential events as triggers may involve identifying potential failures of hardware and/or software installed in the system. The identification of events may also involve identification of periodic logging activities for various parts of the system and/or the entire system. For example, logging data to describe the condition of the system may be broken into useable units and spaced over time to avoid or attenuate down-time associated with logging.

System designers and/or software designers may also identify data to collect in response to each of the events based upon the utility of the data in analyzing the error, failure, or logging event (element 415). After the data to collect in response to events is identified, the location of the data may be stored in a file potentially along with other descriptive information about the data to collect (element 420). For instance, descriptors of data to collect may be included within the file so that the data collector can parse through data at various locations to find the data to collect.

Upon creating the file in, e.g., an ASCII (American Standard Code for Information Interchange) format, the file may be converted into a more compressed format such as a binary format (element 425). The compressed file may then be validated against engineering data to verify that data converted into binary correctly.

After its validation, the binary file may be stored in non-volatile memory of the service processor of the system (element 435). For example, the file may be loaded into the service processor during deployment.

Another embodiment of the invention is implemented as a program product for implementing data collection logic such as systems and methods described with reference to FIGS. 1-4. The invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem, and Ethernet adapter cards are just a few of the currently available types of network adapters.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It will be apparent to those skilled in the art having the benefit of this disclosure that the present disclosure contemplates methods and arrangements to collect data in response to an event. It is understood that the form of the embodiments shown and described in the detailed description and the drawings are to be taken merely as examples. It is intended that the following claims be interpreted broadly to embrace all variations of the example embodiments disclosed.

Although the present disclosure and some of its advantages have been described in detail for some embodiments, it should be understood that various changes, substitutions, and alterations can be made herein without departing from the spirit and scope of the disclosure as defined by the appended claims. Although specific embodiments of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method to gather data from a system in response to an event of the system, the method comprising:
    identifying, by an event identifier, the event;
    accessing, by a data collector, a file to relate the event to data to collect in response to identifying the event, the file comprising more than one entry, each entry being associated with a different event in a plurality of events, each entry comprising a data identification specifying data to collect for a corresponding event, and a sequence by which to collect the data to collect for the corresponding event, wherein at least two entries in the file, corresponding to two different events, specify different data identifications and different sequences by which to collect the data to collect, such that different data is collected depending upon which event in the two different events is identified by the event identifier;
    retrieving, by the data collector, from the file, an identified entry corresponding to the identified event, and a data identification identifying data to collect and an associated sequence by which to collect the data corresponding to the identified entry, wherein the data identification corresponding to the identified entry comprises at least one memory location from which to collect the data to collect related to the corresponding event; and
    collecting, by the data collector, based upon the data identification corresponding to the identified entry, the data to collect related to the corresponding event from the at least one memory location in accordance with the sequence associated with the retrieved identified entry, wherein:

the associated sequence specifies priorities associated with the collection of different types of data or data at different addresses in the data to collect such that at least one of a first type of data is collected prior to a second type of data, or data at a first address is collected prior to data at a second address, based on the sequence, the at least one memory location comprises an address range, collecting the data to collect related to the event comprises parsing data in the address range to select data from the address range corresponding to the data to collect, and not all of the data in the address range is collected.

2. The method of claim 1, further comprising executing code of the data collector in response to a trigger, the code to collect the data related to a state of the system.

3. The method of claim 1, wherein accessing the file comprises transmitting an indication of the event to the data identifier.

4. The method of claim 1, wherein retrieving the identified entry corresponding to the identified event comprises receiving an indication of the at least one memory location from the data identification based upon the association between the data identification and the event and receiving the associated sequence, wherein the at least one memory location is a memory location from which the data to collect is to be retrieved.

5. The method of claim 4, wherein receiving the indication of the at least one memory location comprises receiving at least one memory address and descriptors to identify the data.

6. The method of claim 1, wherein retrieving the identified entry corresponding to the identified event comprises accessing a data storage device to determine the at least one memory location for the data.

7. The method of claim 1, wherein retrieving the identified entry corresponding to the identified event comprises receiving code to describe collection of the data.

8. The method of claim 1, wherein retrieving the identified entry corresponding to the identified event comprises receiving information to describe a condition precedent to collection of the data.

9. The method of claim 1, wherein collecting, based upon the data identification corresponding to the identified entry, the data comprises parsing data at one or more locations indicated by the identification to identify the data to collect.

10. The method of claim 1, wherein data of a particular data type or at a particular address that will become corrupted due to occurrence of the event is given a higher priority than other priorities in the one or more priorities associated with other data types or data at other addresses in the data to collect.

11. The method of claim 1, wherein data that is more important to collect due to its value in analyzing conditions of the system in relation to the particular event is given a higher priority than other priorities in the one or more priorities associated with other data in the data to collect.

12. The method of claim 1, further comprising:
automatically modifying the file in response to a change in a configuration of the system, wherein the change in configuration of the system comprises at least one of modifications to hardware deployed in the system, a modification to software deployed in the system, an addition of new hardware in the system, or an addition of new software in the system.

13. The method of claim 1, wherein the plurality of events are events associated with at least one of failures or errors occurring in the functioning of at least one of one or more software components or one or more hardware components of the system, or an alert event for initiating storing a state of the system.

14. An apparatus to collect data from a system, the apparatus comprising:
a processor;
an event identifier to identify, via the processor, an event as a trigger to collect the data;
a data collector to collect, via the processor, the data associated with the event in a specified sequence associated with the event specified via a data identification of the data related to the event; and
a data identifier in communication with the data collector to retrieve, from data storage, the data identification and an associated sequence by which to collect the data based upon an association between the data identification and the event, the data identification comprising one or more locations, associated with the data, from which to collect the data, and to communicate the identification to the data collector, wherein:
the data storage stores a plurality of data identifications of data to collect associated with corresponding events in a plurality of events,
at least two of the data identifications of data to collect associated with at least two different corresponding events are different from each other such that different data is collected depending upon which of the at least two events occurs and the different data is collected in accordance with different associated sequences,
the specified sequence specifies priorities associated with the collection of different types of data or data at different addresses in the data to collect such that at least one of a first type of data is collected prior to a second type of data, or data at a first address is collected prior to data at a second address, based on the sequence,
a first sequence associated with a first event in the plurality of events is different from a second sequence associated with a second event in the plurality of events,
the one or more locations comprises an address range,
collecting the data to collect related to the event comprises parsing data in the address range to select data from the address range corresponding to the data to collect, and not all of the data in the address range is collected.

15. The apparatus of claim 14, wherein the data collector comprises a parsing module to parse the data at the one or more locations to locate the data to collect in response to the event.

16. The apparatus of claim 14, wherein the data identifier comprises a file in the data storage, wherein the file comprises the data identification, the data identification comprising information about data to collect related to the event.

17. The apparatus of claim 16, where the data identifier comprises an interface to modify the file.

18. The apparatus of claim 14, wherein the data identifier comprises a sequence identifier to identify the sequence associated with collection of the data in response to the event.

19. A system to collect data from a system in response to an event, the system comprising:
a computer system comprising a data collector to collect data associated with the event in a specified sequence associated with the event specified in a data identification that specifies the data related to the event and the specified sequence associated with the event; and
a service processor to identify an event as a trigger to collect the data, in communication with the data collector to retrieve, from data storage, the data identification comprising one or more locations related to the data, from which to collect the data, and the specified sequence with which to collect the data based upon an association between the data identification and the event, and to communicate the one or more locations to the data collector, wherein:

the data storage stores a plurality of data identifications of data to collect associated with corresponding events in a plurality of events, at least two of the identifications of data to collect associated with at least two different corresponding events are different from each other such that different data is collected depending upon which of the at least two events occurs and the different data is collected in accordance with different associated sequences, the specified sequence specifies priorities associated with the collection of different types of data or data at different addresses in the data to collect such that at least one of a first type of data is collected prior to a second type of data, or data at a first address is collected prior to data at a second address, based on the sequence, a first sequence associated with a first event in the plurality of events is different from a second sequence associated with a second event in the plurality of events, the one or more locations comprises an address range, collecting the data to collect related to the event comprises parsing data in the address range to select data from the address range corresponding to the data to collect, and not all of the data in the address range is collected.

20. The system of claim 19, further comprising a remote system interface to communicate with a remote system to collect the data from the remote system in response to the event.

21. The system of claim 19, wherein the data collector comprises dump code, in non-volatile memory of the data storage of the computer system, to execute on a processor of the computer system.

22. A computer program product comprising a computer useable storage medium having a computer readable program, wherein the computer readable program when executed on a computer causes the computer to:

receive an indication of the event at a data identifier;

retrieve, by the data identifier, from a file, an identification of the data to collect from one or more locations, and an associated sequence by which to collect the data based upon an association between the identification and the event, to relate the event to the data to collect in response to the event, the file comprising more than one identifications, each identification being associated with a different event in a plurality of events and specifying data to collect for an associated event and a sequence by which to collect the specified data to collect, wherein at least two of the identifications of data to collect and at least two sequences associated with at least two different corresponding events are different from each other such that different data is collected in a different sequence depending upon which of the at least two events occurs; and collect, by a data collector, the data to collect based upon the identification, to store the data to collect in an output file in accordance with the associated sequence, wherein:

the sequence specifies priorities associated with the collection of different types of data or data at different addresses in the data to collect such that at least one of a first type of data is collected prior to a second type of data, or data at a first address is collected prior to data at a second address, based on the sequence, the one or more locations comprises an address range, collecting the data to collect related to the event comprises parsing data in the address range to select data from the address range corresponding to the data to collect, and not all of the data in the address range is collected.

23. The computer program product of claim 22, wherein the computer readable program causes the computer to retrieve, by the data identifier, from a file at least by parsing the file to locate the identification of the data based upon the event.

24. A method to gather data from a system in response to an event of the system, the method comprising:

identifying, by an event identifier, the event;

accessing, by a data collector via a data identifier, a file to relate the event to data to collect in response to the event, the file comprising more than one data identifications, each data identification being associated with a different event in a plurality of events and specifying data to collect for an associated event and a specified sequence by which to collect the specified data to collect, wherein the specified sequence specifies priorities associated with the collection of different types of data or data at different addresses in the data to collect associated with the event, wherein at least two of the data identifications of data to collect associated with at least two different corresponding events are different from each other such that different data is collected depending upon which of the at least two events occurs, and wherein a first sequence associated with a first event in the plurality of events is different from a second sequence associated with a second event in the plurality of events;

retrieving, by the data collector via the data identifier, from the file, a data identification of the data to collect and an associated specified sequence by which to collect the data based upon an association between the data identification and the identified event, wherein the data identification comprises at least one memory location from which to collect the data related to the identified event; and collecting, by the data collector, based upon the retrieved data identification, the data to collect related to the event from the at least one memory location in accordance with the specified sequence associated with the retrieved data identification of the data to collect such that at least one of a first type of data is collected prior to a second type of data, or data at a first address is collected prior to data at a second address, based on the specified sequence, wherein the data identifier comprises a rule module, a binary file, an event identifier, a trigger list, and an output file, and wherein:

the event identifier compares events against the trigger list to determine whether the event should trigger collection of the data to collect;

in response to the event identifier determining that the event should trigger collection of data to collect, the rule module accesses the binary file to determine whether code in the binary file is associated with the event;

in response to the code in the binary file being associated with the event, the rule module communicates the code in the binary file to the data collector to thereby instruct the data collector to collect the data using the code;

the output file comprises a data structure to contain the data collected in response to the event, the at least one memory location comprises an address range;

collecting the data to collect related to the event comprises
parsing data in the address range to select data from the
address range corresponding to the data to collect; and
not all of the data in the address range is collected.

* * * * *